(12) United States Patent
Ko et al.

(10) Patent No.: US 9,880,447 B2
(45) Date of Patent: Jan. 30, 2018

(54) CAMERA MODULE ASSEMBLY WITH MOVABLE REFLECTIVE ELEMENTS

(71) Applicant: GOOGLE INC., Mountain View, CA (US)

(72) Inventors: Jamyuen Ko, San Jose, CA (US); Choon Ping Chng, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/193,740

(22) Filed: Jun. 27, 2016

(65) Prior Publication Data

US 2017/0371230 A1    Dec. 28, 2017

(51) Int. Cl.
| | |
|---|---|
| H04N 5/225 | (2006.01) |
| G03B 5/00 | (2006.01) |
| H04N 5/232 | (2006.01) |
| G03B 17/17 | (2006.01) |
| G02B 26/08 | (2006.01) |
| G02B 7/182 | (2006.01) |

(52) U.S. Cl.
CPC ............. *G03B 5/00* (2013.01); *G02B 7/1828* (2013.01); *G02B 26/0816* (2013.01); *G03B 17/17* (2013.01); *H04N 5/2252* (2013.01); *H04N 5/2254* (2013.01); *H04N 5/23245* (2013.01)

(58) Field of Classification Search
CPC ........ G03B 5/00; G03B 17/17; H04N 5/2252; H04N 5/23245; H04N 5/2254; G02B 7/1828; G02B 26/0816
See application file for complete search history.

(56) References Cited

U.S. PATENT DOCUMENTS

| | | | |
|---|---|---|---|
| 7,019,784 B1 | 3/2006 | Shibuya et al. | |
| 2013/0222914 A1* | 8/2013 | Han | H02K 41/0356 |
| | | | 359/557 |
| 2014/0218587 A1 | 8/2014 | Shah et al. | |
| 2015/0005031 A1 | 1/2015 | Sheu | |
| 2015/0077623 A1 | 3/2015 | Lo et al. | |

(Continued)

FOREIGN PATENT DOCUMENTS

| | | |
|---|---|---|
| CN | 103533221 A | 1/2014 |
| WO | 2011141930 A1 | 11/2011 |

OTHER PUBLICATIONS

Combined Search and Examination Report issued in UK Patent Application No. GB1621599.8, dated Feb. 22, 2017, 6 pages.

(Continued)

*Primary Examiner* — Twyler Haskins
*Assistant Examiner* — Angel L Garces-Rivera
(74) *Attorney, Agent, or Firm* — Brake Hughes Bellermann LLP (57) ABSTRACT

A camera apparatus is described that includes a frame housing and a camera module affixed to the frame housing. The camera module may include a lens and an image sensor. The camera apparatus may include a reflective element and a motor. The reflective element may be disposed within the frame housing, the reflective element being movable relative to the lens to select a direction from which the lens collects light. The motor may be adapted to move the reflective element in response to detecting a magnetic field change generated by at least one magnet disposed within the frame housing.

20 Claims, 9 Drawing Sheets

(56) References Cited

U.S. PATENT DOCUMENTS

2015/0153835 A1 6/2015 Perez et al.
2015/0237241 A1* 8/2015 Wilson ................. H04N 5/2254
　　　　　　　　　　　　　　　　　　　　　　　　348/36

OTHER PUBLICATIONS

Kan, "Huawei's new smartphone has a 180-degree rotating camera", Kan, "Huawei's new smartphone has a 180-degree rotating camera", IDG News Service, Aug. 20, 2015, 3 pages, Aug. 20, 2015, 3 pages.
Smith, "Lenovo's Yoga 3 Pro Tablet Has an Embedded, Rotating Pico Projector", Smith, "Lenovo's Yoga 3 Pro Tablet Has an Embedded, Rotating Pico Projector", Laptop Magazine (http://www.laptopmag.com/articles/lenovoyogatab3pro), Sep. 2, 2015, 8 pages, Sep. 2, 2015, 8 pages.

* cited by examiner

CAMERA MODULE ASSEMBLY WITH MOVABLE REFLECTIVE ELEMENTS

TECHNICAL FIELD

This description generally relates to portable electronic devices having movable reflective elements.

BACKGROUND

Camera housing devices can include any number of cameras and lenses that may be configured to capture particular angles of a scene. For example, multiple cameras housed on a single device may be directed at a specific capture angle and particular scene content can be captured from such an angle. Each camera on the device can be configured to capture particular angles of the scene.

SUMMARY

In one general aspect, a camera apparatus is described that includes a frame housing and a camera module affixed to the frame housing. The camera module may include at least one lens, an image sensor, and a reflective element disposed within the frame housing. The reflective element may be movable relative to the lens to select a direction from which the lens collects light. The camera module may also include a motor adapted to move the reflective element in response to detecting a magnetic field change generated by at least one magnet disposed within the frame housing. Other embodiments of this aspect include corresponding computer systems, apparatus, and computer programs recorded on one or more computer storage devices, each configured to perform the actions of the methods described herein.

Implementations may include one or more of the following features. The apparatus in which the motor is a cylindrical motor and includes a circular driving coil electrically connected to a control unit on a printed circuit board operable to receive current and transmit the current through the circular driving coil to turn the motor. The motor may be adapted to move the reflective element from a first position to a second position within the frame housing and the turn can automatically select a front-facing capture mode or a rear-facing capture mode for the camera apparatus.

Implementations can include the apparatus in which the motor includes a rectangular coil electrically connected to a control unit on a printed circuit board operable to receive current and transmit the current through the rectangular coil to turn the motor. The motor may be adapted to move the reflective element from a first position to a second position within the frame housing. The turning of the motor may automatically select a front-facing capture mode or a rear-facing capture mode for the camera apparatus.

Implementations can include the apparatus in which the reflective element includes a first mirror affixed to a first plane of the reflective element and a second mirror affixed to a second plane of the reflective element. The reflective element may be pivotable about the frame housing to direct light from the first mirror to the lens in response to detecting the reflective element is in the first position, and to direct light from the second mirror to the lens in response to detecting that the reflective element is in the second position.

Implementations can include the apparatus in which the reflective element is wedge-shaped and the first mirror and the second mirror are integrated into the reflective element. The first mirror may be angled at about 45 degrees to the second mirror. Implementations can include the apparatus in which the first mirror and the second mirror each include at least one coating of dielectric material affixed to the reflective element. The apparatus may also include a dowel pin coupled to the reflective element such that the reflective element is rotatable about the dowel pin. May also include a cam adapted to receive rotational input from the motor to move the reflective element from a first position to a second position until engaging a stop surface. In some implementations, the first position selects a rear-facing capture mode and the second position selects a front-facing camera mode. Implementations of the described techniques may include hardware, a method or process, or computer software on a computer-accessible medium.

In a second general aspect, a portable electronic device is described. The portable electronic device may include a case including a front surface, a rear surface facing away from the front surface, and a through-hole defining an area between the front surface and rear surface. The through-hole may be adapted to receive an image capture assembly and the image capture assembly may include a camera adapted to select a capture mode in which to capture images and a keyboard communicably coupled to the case. The camera may include a motorized reflective element adapted to select a direction from which to direct incoming light to a lens in the camera. Thee selected direction may indicate the capture mode. Other embodiments of this aspect include corresponding computer systems, apparatus, and computer programs recorded on one or more computer storage devices, each configured to perform the actions of the methods.

Implementations may include one or more of the following features. The portable electronic device may include a motorized reflective element that is wedge-shaped with at least two sides of the wedge including reflective coatings. The motorized reflective element may automatically reflect light beams to a portion of an image sensor. The portion of the image sensor may be selected based at least in part on the capture mode. The capture mode may be used to select a front-facing direction for image capture or a rear-facing direction for image capture. In some implementations, the front-facing direction is a selfie mode associated with capturing image content of a user of the portable electronic device. Implementations of the described techniques may include hardware, a method or process, or computer software on a computer-accessible medium.

In a third general aspect, a portable electronic device is described. The portable electronic device may include a display panel and a camera apparatus. The camera apparatus may include at least one lens, an image sensor, and a reflective element. The reflective element may include a base and a first reflective surface angled at about 45 degrees to a second reflective surface. The first and second surface may be seated on the base and connected at a first edge to form the about 45 degree angle and connected at an opposite edge to a dowel pin engaging a motor adapted to move the reflective element based on detected input received at the image sensor. Other embodiments of this aspect include corresponding computer systems, apparatus, and computer programs recorded on one or more computer storage devices, each configured to perform the actions of the methods.

Implementations may include one or more of the following features. A portable electronic device in which the input received at the image sensor causes the reflective element to move from a first position to a second position. The move may be directed in a plane parallel to the base of the reflective element upon detecting an input selecting a front-facing capture mode or a rear-facing capture mode. Implementations may include a portable electronic device in which the reflective element is further adapted to select a direction from which to automatically direct incoming light to the lens.

Implementations may include a portable electronic device in which the first reflective surface includes a first mirror and the second reflective surface includes a second mirror and the reflective element is adapted to be pivotable about the base to direct light from the first mirror to the lens in response to detecting the reflective element is in the first position and to direct light from the second mirror to the lens in response to detecting that the reflective element is in the second position. In some implementations, the reflective element is wedge-shaped and the first mirror and second mirror are connectively coupled to the base, the first mirror being placed at about 45 degrees to the second mirror. In some implementations, the portable electronic device may also include the portable electronic device where the portable electronic device is a laptop computing device. Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Capturing image content using portable electronic devices generally includes opening a camera application, aiming the camera of the device to capture image content, and executing capture of the image content. Portable electronic device users may rely on seamless integration of camera hardware with camera software to capture such image content. Simplifying any portion of the hardware or software can provide advantages to the portable electronic device user. For example, reducing hardware components or software complexity can provide ease of use of the device as well as a reduction of device cost to the device user. For example, using a single camera module in an electronic device instead of two cameras can enable cost savings. Moreover, adapting a single camera module to obtain images in more than one direction without moving a display panel of the device may allow for reductions in manufacturing cost, processing cost, and simplification of software algorithms from two camera modules to a single camera module.

In general, the portable electronic devices described herein may pertain to one or more of a laptop, a mobile phone device, a tablet, a notebook device, a standalone camera, a head-mounted display device (HMD), a video camera, an image sensor, a stereoscopic camera, an infrared camera, a depth-sensing camera and the like. In a typical portable electronic device, a front-facing camera may be included in addition to a rear-facing camera. The front-facing cameras generally enhance user experience when performing a self-portrait (i.e., selfie), engaging in video conferencing, capturing video and/or images, or engaging in social chat activities. By convention, the image resolution of a front-facing camera is typically lower than that of rear-facing camera because high-resolution image capture in the above activities may not be of interest to the user. However, in rear-facing cameras, higher performance and higher quality cameras may be desired. Thus, portable electronic device manufacturers can determine which cameras to install on manufactured devices.

Instead of both a front-facing and rear-facing camera, the systems and devices described herein include a single camera (e.g., camera module) that may capture both front-facing imagery and back-facing imagery with respect to the device. The single camera can provide high-resolution image capture for any activity carried out on the portable electronic devices described herein. In one non-limiting example, a portable electronic device may house a single camera module to automatically alternate between capturing image content from a front-facing angle or a rear-facing angle. The single camera module may be a high-resolution camera with a movable reflective element driven by a motor to provide front-facing and rear-facing photography, video conferencing, video/image capture, and the like. Thus, the systems and devices described herein can enhance a single camera module to perform tasks typically performed by a system configured with two (or more) camera modules.

Particular reflective mechanisms described herein can enable such a dual use of a single camera module. For example, a reflective mechanism may include a reflective coated mirror block that includes two mirrors. The mirror block may be manufactured and seated between a camera module and a motor configured to drive the mirror block to move between a number of different positions. In operation, the mirror block can be a flip-able, slide-able, rotatable, or otherwise movable reflective/mirror mechanism found inside a camera assembly and operable to steer incoming light to a lens mechanism in the camera assembly. The steering of light may be based on flipping or rotating the mirror block in a particular fashion (using the motor) to engage a front-facing type of image capture or a rear-facing type of image capture. The mirror block structures (e.g., reflective elements) described throughout this disclosure may function to adapt the single camera/single lens to perform dual functions of both forward and rear-facing image capture.

Figure 1:
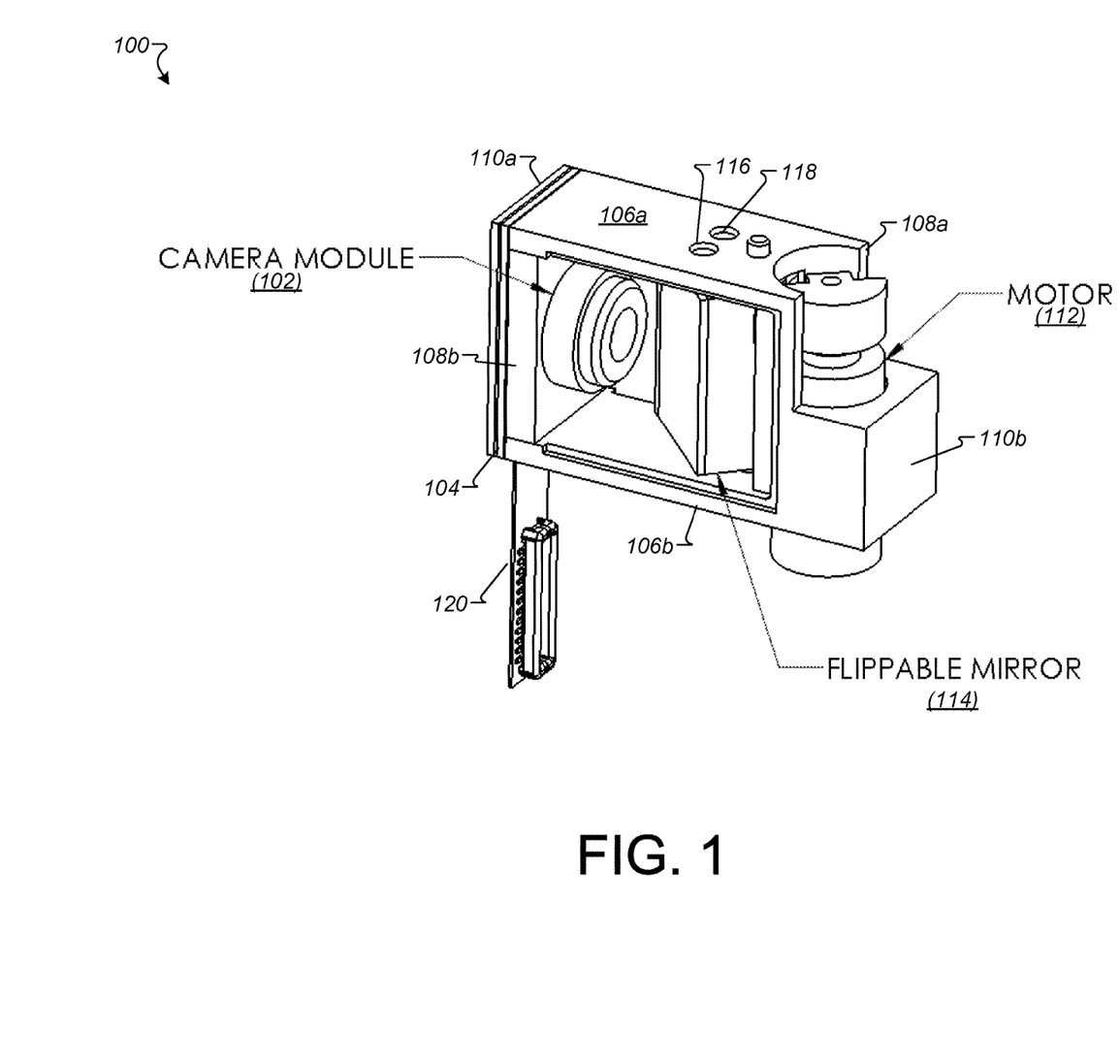
FIG. 1 is a cross-sectional view of a camera assembly.

FIG. 1 is a cross-sectional view of a camera assembly 100. Camera assembly 100 includes a camera module 102 housed in a frame housing 104. The frame 104 may be manufactured with high tolerance accuracy to ensure rigid adherence to maintaining a consistent angle between the lens optical axis and the normal direction to the reflective element. The frame housing 104 may be composed of particular materials to ensure strict tolerance measurements are upheld and to minimize expansion of the materials. Example frame materials may include, but are not limited to polyamideimide (PAI), polyetherimide (PEI), liquid crystal polymers (LCP), or other materials with a small coefficient (e.g., less than 60 μm/mC) of thermal expansion (CTE).

As shown, the frame housing 104 is substantially rectangular and includes two opposite sidewalls 106a and 106b, two opposite sidewalls 108a and 108b, and two opposite end walls 110a and 110b. An annular mounting hole is defined in wall 110a to house the camera module 102. An annular through-hole is defined in wall 106a to house a motor 112. Although frame housing 104 is shown substantially rectangular, the frame housing may take any shape that can include the camera assemblies described herein and such that the camera assembly and the frame housing can be seated within a particular portable electronic device.

The camera assembly 100 also includes at least one lens, any number of sensors, and any number of filters as well as a reflective element 114 (e.g., flip-able/movable mirrors) seated between the camera module 102 and the motor 112. The motor 112 can be glued, press fit, or otherwise adapted to fit into the camera frame housing 104. In some implementations, the reflective element 114 is a mirrored surface placed on a wedge-shaped apparatus. The rotation may be in a single x-y plane with respect to a base of the frame housing 104, for example. In some implementations, the movement may be a partial rotation of a circle. In some implementations, the movement may be in a straight line from a first position of the reflective element 114 (e.g., mirror) to a second position of the reflective element 114. The movement may function to select which of a number of available viewing angles is selected for capturing images with the camera module 102.

In operation, the reflective element 114 (e.g., flippable/movable mirror) in camera assembly 100 represents a movable mirror structure to enable capturing image content in any number of selectable directions with a single camera without having to move a display associated with the camera assembly (housed in a portable electronic device). In some example implementations, the camera assembly 100 may be electronically movable (e.g., motorized) to move about an axis to align an active camera area in which to capture image content.

In one non-limiting example, the assembly 100 is a camera apparatus that includes a frame housing 104 that houses a camera module 102 affixed to a first surface (e.g., sidewall) of the frame housing 104. The camera module 102 includes a lens. The depicted example frame housing 104 includes two opposite walls 106a and 106b, two opposite sidewalls 108a and 108b, and two opposite end walls 110a and 110b. An annular mounting hole is defined in wall 110a to house the camera module 102 with the lens and one or more image sensors.

The frame housing 104 also includes a reflective element (e.g., flippable mirror 114) affixed to the second surface (e.g., wall 106b) of the frame housing at an angle perpendicular to the first surface (e.g., sidewall 108b) of the frame housing. The reflective element 114 may be configured to select an angle from which to direct incoming light to the lens.

An annular through-hole is defined in wall 108a to house a motor 112. The motor may be adapted to move the reflective element in response to detecting a magnetic field change generated by at least one magnet (e.g., magnets 116 or 118) affixed to the frame housing 104.

In some implementations, the motor 112 is a cylindrical motor and includes a circular driving coil electrically connected to a control unit on a printed circuit board 120 and is operable to receive current and transmit the current through the circular driving coil to turn the motor. The motor 112 may be adapted to move the reflective element (e.g., flippable mirror 114) from a first position to a second position within the frame housing. The turn (e.g., movement) may automatically select a front-facing capture mode or a rear-facing capture mode of the camera depending on the angle of element 114.

In some implementations, the motor 112 includes a rectangular coil electrically connected to a control unit on the printed circuit board 120 and is operable to receive current and transmit the current through the rectangular coil to turn the motor. The motor may be adapted to move the reflective element (e.g., flippable mirror 114) from a first position to a second position within the frame housing. The turn (e.g., movement) may automatically select a front-facing capture mode or a rear-facing capture mode of the camera.

Figure 2:
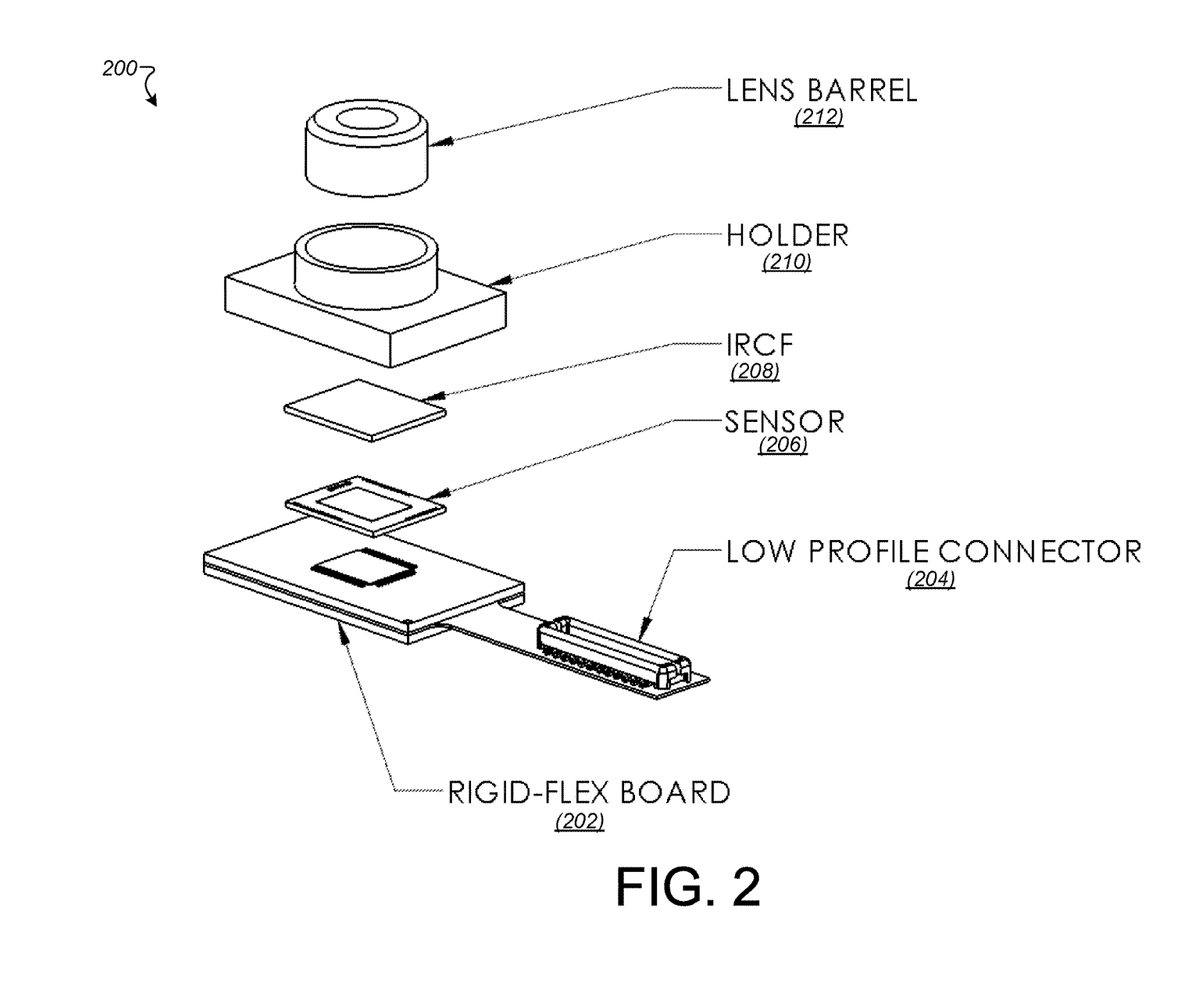
FIG. 2 is an exploded view of portions of the camera assembly shown in FIG. 1.

In one non-limiting example, the camera assembly 100 (e.g., camera apparatus) includes a frame housing and a camera module 102 affixed to the frame housing 104. The camera module 102 may include a lens and an image sensor (as shown in FIG. 2). The camera assembly 100 may include a reflective element 114 disposed within the frame housing 104. The reflective element 114 may be movable relative to the lens to select a direction from which the lens collects light. The camera assembly 100 may also include a motor adapted to move the reflective element in response to detecting a magnetic field change generated by at least one magnet disposed within the frame housing.

FIG. 2 is an exploded view 200 of the camera assembly 100 shown in FIG. 1. The camera assembly 100 includes a rigid-flex board 202 adaptively coupled to connector 204 for connecting the assembly 100 to a portable electronic device. The PCB board 202 is adapted to receive at least one onboard RGB sensor 206 which is electrically connected to board 202. The RGB sensor 206 may be coupled to an infrared cut filter (IRCF) 208. A holder 210 is configured to rigidly coupled to lens barrel 212, the paired combination being adaptable to be rigidly coupled to the rigid-flex board 202 on top of sensor 206 ad IRCF 208.

In operation, the RGB sensor 206 can convert image into electrical signals that can be sent via board 202 traces and out connector 204. The IRCF 208 can filter out an infrared region of incoming light. The lens barrel 212 may include a number of parts of individual lenses or lens components assembled together to image content onto the sensor.

Figure 3:
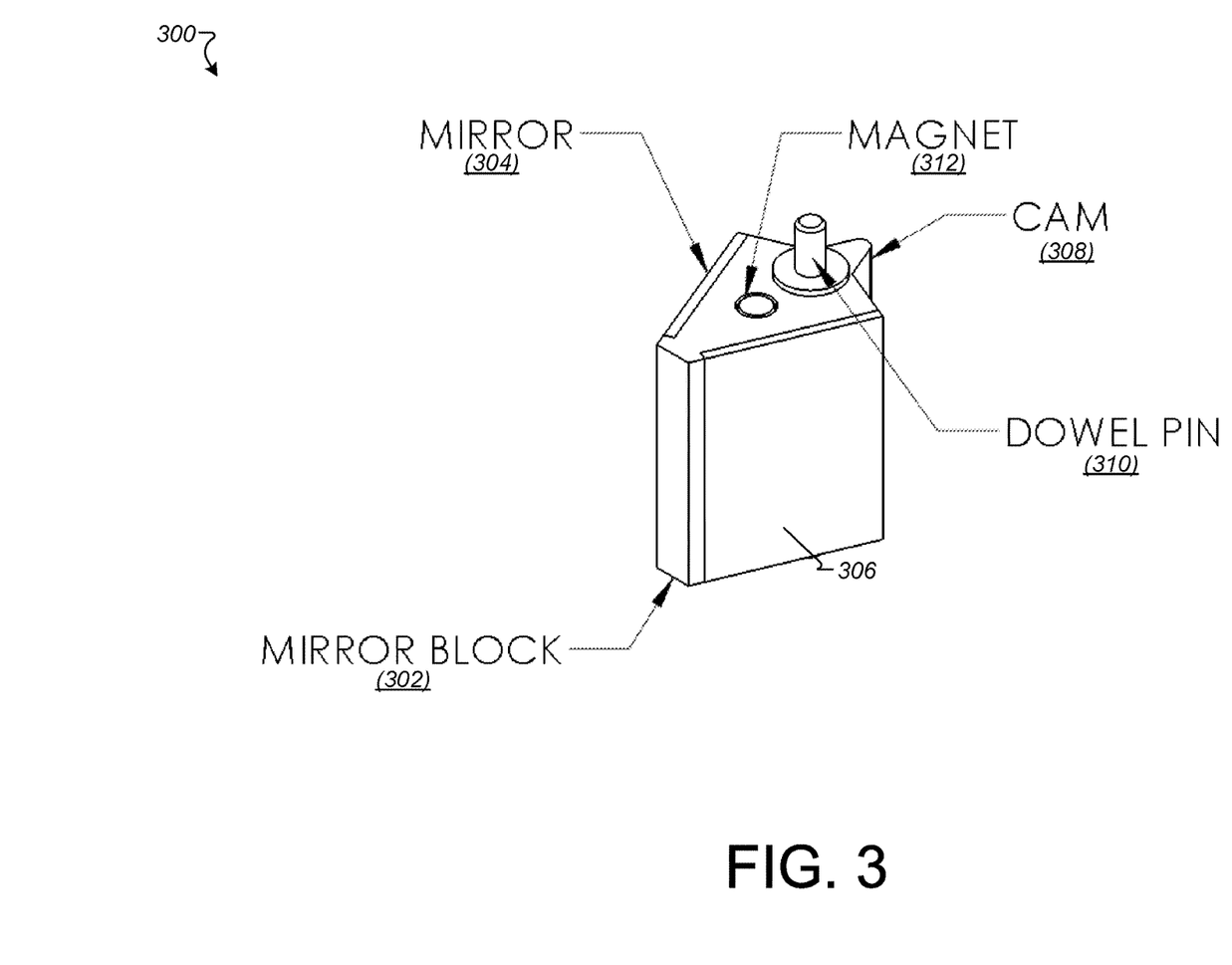
FIG. 3 is a cross-sectional view of a reflective element associated with the camera assembly shown in FIG. 1.

FIG. 3 is a cross-sectional view of a reflective element 300 associated with the camera assembly 100 shown in FIG. 1. The reflective element 300 may include a mirror block 302. The mirror block 302 may take any shape adaptable to fit within camera assembly 100. In some implementations, the mirror block 302 is wedge-shaped in which one side of the wedge is narrower than an opposite side of the wedge. In other implementations, the mirror block 302 is triangular, circular, rectangular, cubic, or polygonal. The mirror block may be molded or milled and may function to hold both a first mirror structure 304 and the second mirror structure 306. As shown, the mirror block 302 includes four sides. A first side measures about 0.7 mm, a second side measures about 6 mm, a third side measures about 6 mm, and a fourth side measures about 5.5 mm. The two longest sides may be adapted to be seated at about 45 degrees between the sides. Each angled side may include a dielectric coated mirror structure. For example, mirror block 302 includes a first mirror structure 304 and a second mirror structure 306. In one non-limiting example, each structure 304 and 306 on the mirror block may be coated with a highly reflective coating.

For example, the mirrors may be created by coating sides of the block 302 with a film having properties of the visible range of the optical spectrum with the films from about 380 nm to about 780 nm. The coatings may have a reflectance specified at about 97 percent.

The mirror block 302 includes a mechanical cam 308 functional to allow a motor (shown in FIG. 1) to work to turn the mirror block 302 about an axis associated with a dowel pin 310. The dowel pin 310 may be coupled to the reflective element such that the reflective element is rotatable about the dowel pin 310. The turn may depend on how a driving surface, at the motor, drives the cam 308.

In one non-limiting example, the reflective elements (housed on mirror block 302) include the first mirror 304 affixed to a first plane and the second mirror 306 affixed to a second plane. The mirror block 302 (e.g., with reflective elements) may be pivotable about the frame housing to direct light from the first mirror 304 to the lens in response to detecting the mirror block 302 is in the first position. Similarly, the mirror block 302 (e.g., reflective elements) may be pivotable about the frame housing to direct light from the second mirror to the lens in response to detecting that the mirror block 302 is in the second position.

In some implementations, the mirror block 302 is wedge-shaped and the first mirror 304 and the second mirror 306 are integrated into the mirror block 302. The first mirror 304 may be placed at an angle of about 45 degrees to the second mirror 306. In some implementations, the first mirror 304 and the second mirror 306 each include at least one coating of dielectric material affixed to the mirror block 302 (e.g., reflective element). The mirror block may be affixed to the second surface of a frame of the camera apparatus (e.g., camera apparatus 100) using the dowel pin 310. The dowel pin 310 may be plastic overmolded to seat the first mirror 304 of the mirror block 302 at a 45-degree angle to the second mirror 306 of the mirror block 302.

Figure 5:
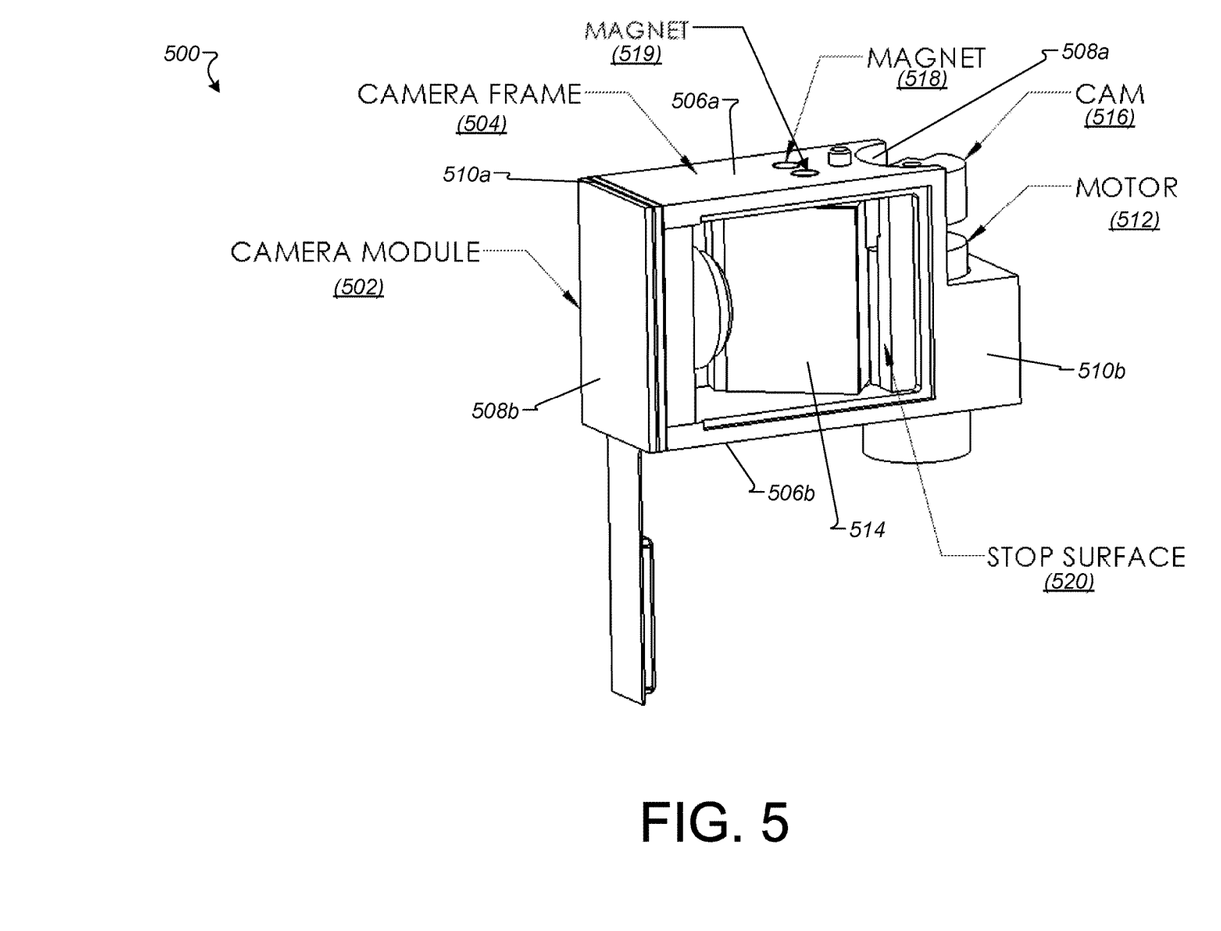
FIG. 5 is a cross-sectional view of the camera assembly shown in FIG. 1.

In some implementations, the mirror block includes the cam 308 adapted to receive rotational input from the motor (not shown) to move the mirror block 302 from a first position to a second position until engaging a stop surface (as shown in FIG. 5). In general, the first position selects a rear-facing capture mode and the second position selects a front-facing camera mode of the camera apparatus.

Figure 4:
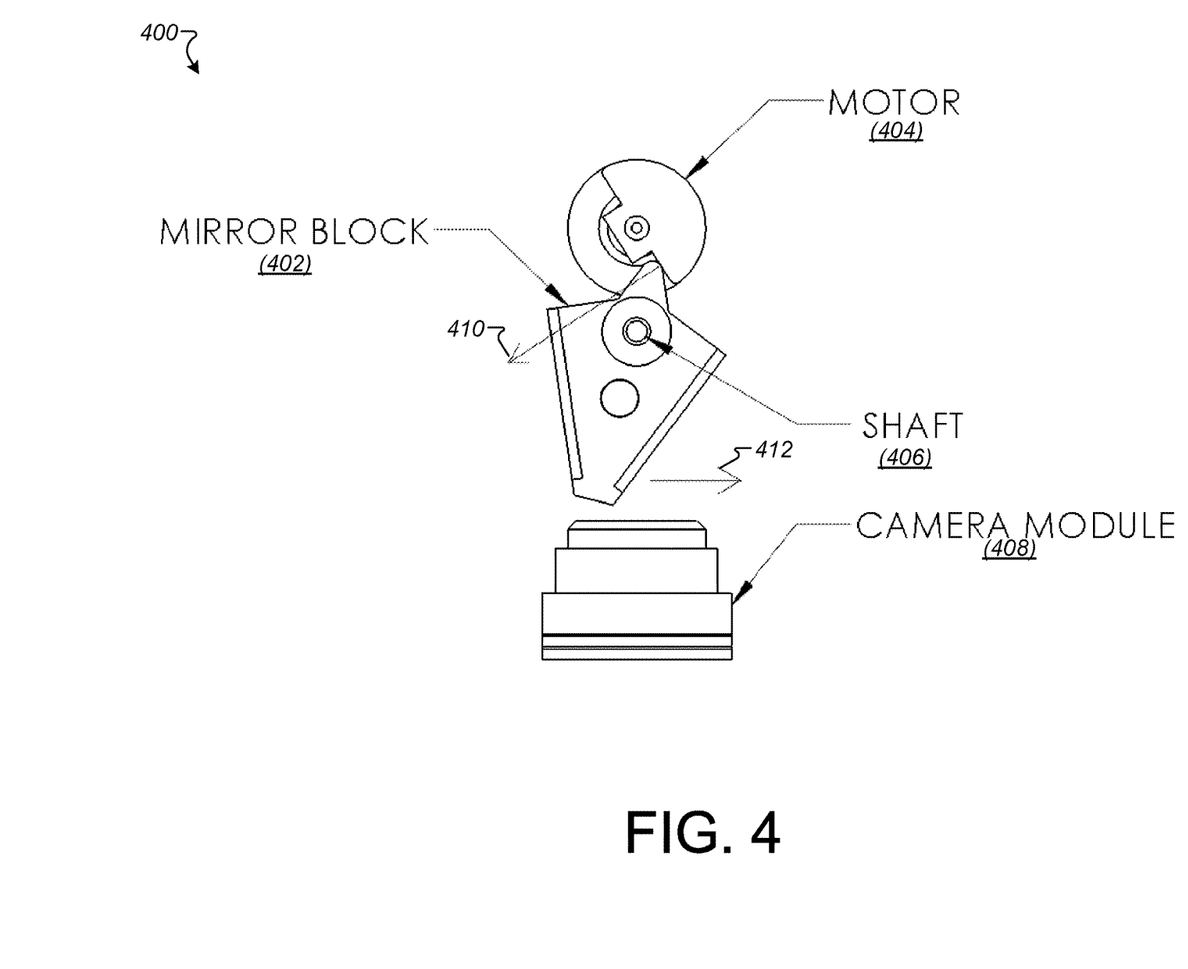
FIG. 4 is a top down view of a portion of a camera assembly.

FIG. 4 is a top down view of a camera assembly 400. In this example, a mirror block 402 is movably attached to a motor 404 via shaft 406. The mirror block 402 may be moved via physical movement of the motor running in response to applied current. The mirror block 402 is seated between the motor 404 and a camera module 408.

The motor 404 may be a standalone motor having positive and negative electric poles. At one end of shaft 406, the motor 404 may have a small driving cam (not shown in FIG. 4) that is attached and used to touch and drive a mechanical cam of the mirror block 402. The rotation direction may depend on an applied current flow direction. The motor 404 depicted in the figures illustrates a cylindrical motor having a cylindrical coil. However, the motor 404 may instead use a rectangular coil with each motor described herein.

In operation, FIG. 4 illustrates an example of turning the mirror block 402 counter-clockwise (arrow 412) while the motor 404 drives the cam/shaft 406 clockwise (shown by arrow 410). In one example, the clockwise turn may trigger the mirror block 402 to be shifted to a position to select a rear-facing capture mode for the camera apparatus. In the same fashion, the motor 404 can drive the cam/shaft 406 counter-clockwise to turn the mirror block 402 clockwise. In one example, the counter-clockwise turn may trigger the mirror block 402 to be shifted to a different position to select a front-facing capture mode for the camera apparatus.

FIG. 5 is another cross-sectional view of the camera assembly shown in FIG. 1. Camera assembly 500 includes a camera module 502 housed in a frame 504. The frame 504 may be manufactured with high tolerance accuracy to ensure rigid adherence to maintaining a consistent angle between the lens optical axis and the reflective element normal. The frame 504 may be composed of particular materials to ensure strict tolerance measurements are upheld and to minimize expansion of the materials. Example frame materials may include, but are not limited to polyamideimide (PAI), polyetherimide (PEI), liquid crystal polymers (LCP), or other materials with a small coefficient (e.g., less than 50 μm/mC) of thermal expansion (CTE).

The frame 504 is substantially rectangular and includes two opposite walls 506a and 506b, two opposite sidewalls 508a and 508b, and two opposite end walls 510a and 510b. A camera module 502 is housed within interior wall 508b. An annular through-hole is defined in wall 506a to house a motor 512.

The camera assembly 500 also includes at least one lens, any number of sensors, and any number of filters as well as a reflective element 514 seated between the camera module 502 and the motor 512. The motor 512 can be glued, press fit or otherwise adapted to fit into the camera frame 504. The motor 512 can be seated to function with a mechanical cam 516.

The camera assembly 500 also includes a magnet 518 and a magnet 519 arranged to interact with movements carried out by the mirror block 514. The magnet 518 and 519 induce opposite poles and each are coupled to frame wall 506a and centered above mirror block 514.

Camera frame 504 includes a physical stop surface 520. The physical stop surface 520 may prevent the mirror block 514 from overturning. For example, when the mirror block 514 approaches a stop position near or at surface 520, the magnet 312 aligns with a portion of the camera frame to engage a magnetic field locking the mirror block 514 in place. That is, because of different magnetic poles being encountered between the magnet 312 (e.g., South Pole force) and the camera frame 504 (e.g., North Pole force), the mirror block 514 will stay in place via such a magnetic force induced by one or both magnets 518 and 519.

Figure 6A:
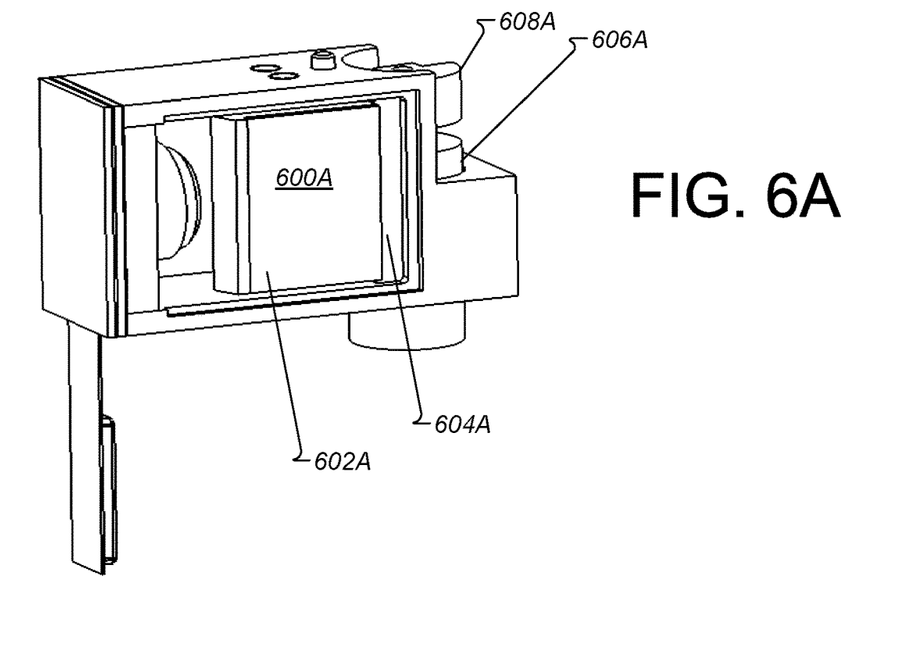
FIGS. 6A and 6B are cross-sectional views of a camera assembly housing a movable reflective element.
Figure 6B:
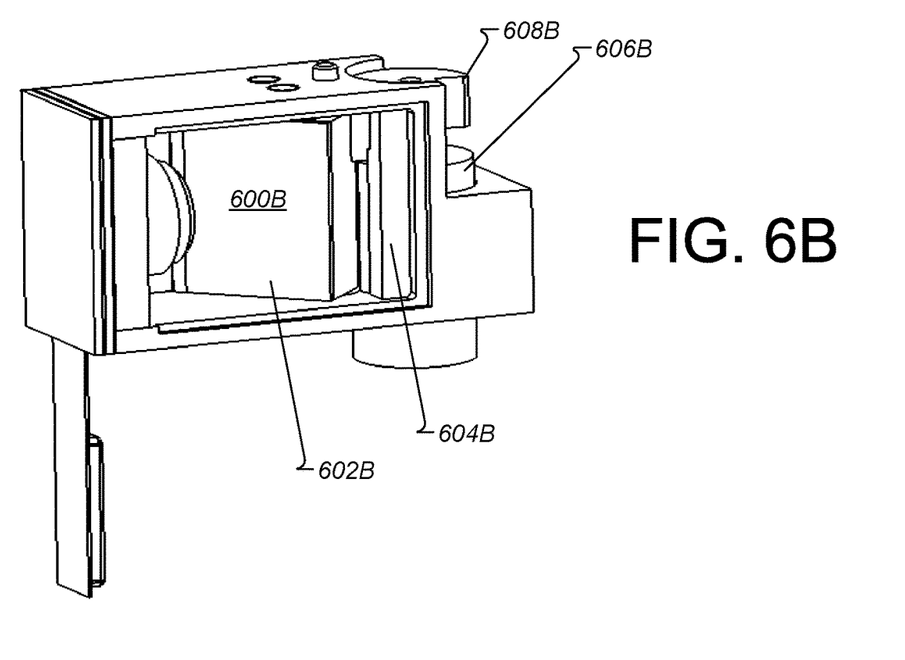

In operation, the camera assembly 500 can function as a high-resolution camera to capture image content from either side of the camera by flipping the mirror block 514, as shown in FIGS. 6A-6B. The flipping of the mirror block 524 does not move any portion of the display or case of the portable electronic device housing the camera assembly 500. Proposed designs may employ the use of non-custom motor or non-custom driving coil(s) as the moving source. In general, the camera assemblies described throughout can be manufactured using a number of non-precision parts to facilitate the flipping of the mirror block mechanism.

FIGS. 6A and 6B are cross-sectional views of a camera assembly housing a reflective element 600A/600B. The reflective element 600A may function with a camera assembly (e.g., assembly 500) to capture images from either side of a camera because the element 600A may be flipped or rotated to a new position to capture images from either side of the camera based on the position of element 600A.

In some implementations, the reflective element 600A may be the same as element 600B and may simply be an example of element 600A in a different position. Elements 600A/600B may include any or all of (1) a mirrored surface on at least two sides of a wedge apparatus, (2) a reflective material coated on two or more sides of the wedge apparatus, two mirrors arranged at about a 45 degree angle to each other on the wedge apparatus, or other reflective coatings adapted to be adhered to the wedge-shaped element 600A or 600B.

In some implementations, the two longest sides of the wedge-shaped apparatus shown by 600A may be adapted to be seated at about 45 degrees between the two sides. In one non-limiting example, each angled side may include a dielectric coated mirror structure. For example, the reflective element 600A includes a first mirror structure (viewable at 602A) and a second mirror structure (not viewable in FIG. 6A) on the opposing side of wall 602A of element 600A. In one non-limiting example, each mirror on the reflective element 600A may be coated with a highly reflective coating. For example, the mirrors may be coated in the visible range of the optical spectrum with films from about 380 nm to about 780 nm and have a reflectance specified at about 97 percent.

In operation, FIG. 6A includes a reflective element 600A engaged by a stop surface 604A upon receiving a signal at the motor 606A to engage (e.g., flip) the reflective element 600A. The reflective element 600A includes a mechanical cam 608A functional to allow the motor 606A to work to turn the element 600A about an axis to flip the element to position 600B, for example. In particular, the reflective element 600A may be adapted to allow a front angled image (e.g., a selfie) to be captured by an onboard camera and to allow a back angled image to be captured by the onboard camera in response to receiving an indication to flip the element from a position shown at 600A, for example, to a position shown at 600B, as shown in FIG. 6B. Similarly, the same mechanisms can function to flip the element from position 600B back to position 600A, as shown by 602B-608B.

Figure 7:
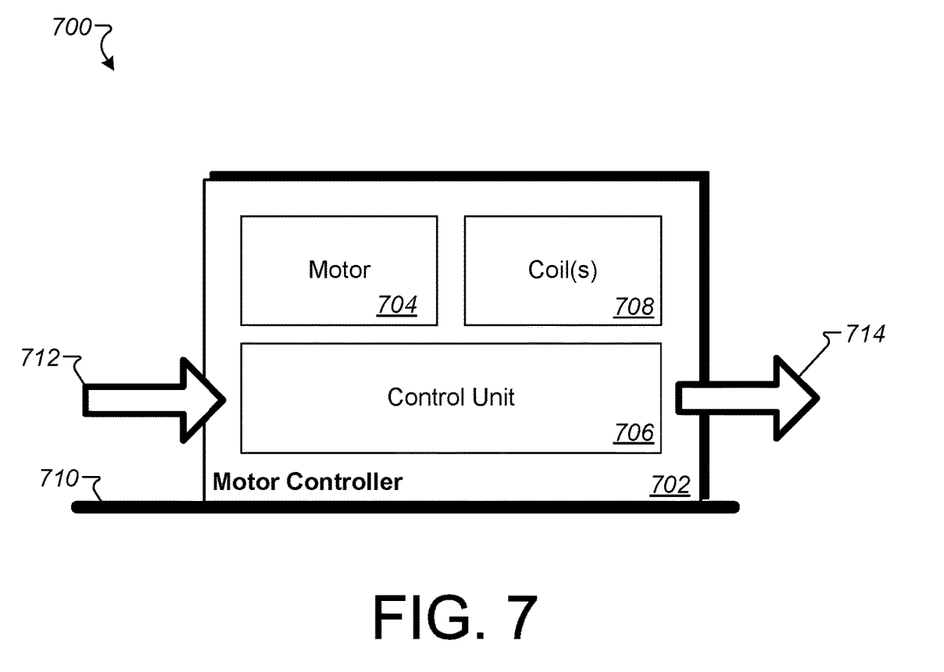
FIG. 7 is a block diagram of a control unit in any one of the camera assemblies described herein.

FIG. 7 is a block diagram of an assembly 700 including a motor controller 702 residing in any one of the camera assemblies described herein. The motor controller 702 includes a motor 704, a control unit 706, and one or more coils 708. The coil 708 is electronically connected to the control unit 706 to control current into and out of the motor 704. The control unit 706 is electronically connected to printed circuit board (PCB) board 710 and can output (shown by arrow 714) any number of different current levels based on receiving input (shown by arrow 712) from a portable electronic device, as described throughout this disclosure. The coil 708 may be an inductance coil that produces a magnetic field in response to being electrified. The current level may dictate the force of the magnetic field, which can drive magnet blocks (e.g., magnets 518 and 519) to move the movable/rotatable/flippable reflective element/mirror block 514 back and forth in a plane. This movement can function to select a capture mode. For example, if the current is about 90 mA running in a first direction, the capture mode may be selected to capture images away from a user accessing the portable electronic device that houses assembly 700. If the current is about 90 mA running in an opposite direction to the first direction, the capture mode may be selected to capture images of the user or of front facing image content (i.e., selfie mode) with respect to a user accessing the portable electronic device that houses assembly 700.

Figure 8:
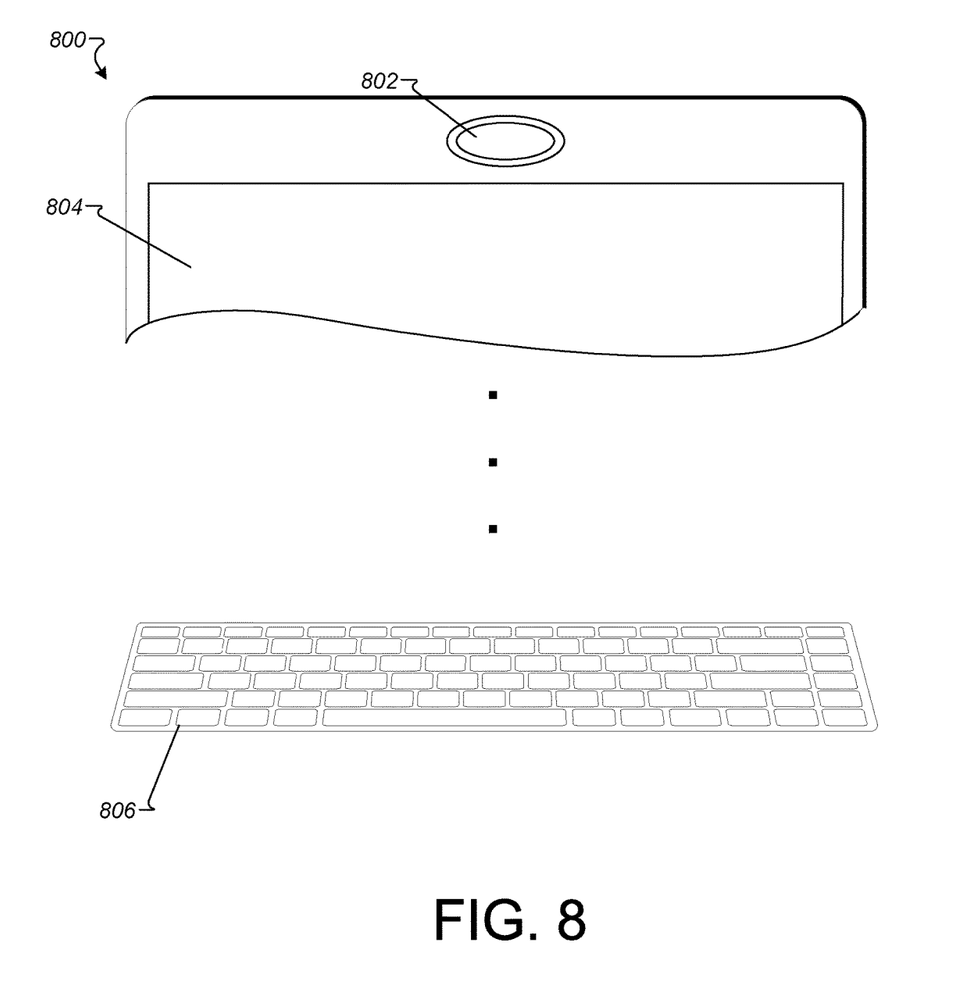
FIG. 8 is a portable electronic device for housing any one of the camera assemblies described herein.

FIG. 8 is a partial view of a portable electronic device 800 housing any one of the camera assemblies described herein. The portable electronic device 800 may be a laptop, a mobile phone device, a tablet, a notebook device, a standalone camera device, a head-mounted display device (HMD), a video camera, an image sensor, a stereoscopic camera, an infrared camera, a depth-sensing camera, and the like.

In general, the portable electronic device 800 may be configured with a single camera 802 adapted to capture images from a front-facing angle or a rear-facing angle with respect to device 800. The single camera module may be a high-resolution camera with a movable reflective element driven by a motor to provide front-facing and rear-facing photography, video conferencing, video/image capture, and the like.

The camera 802 is electronically connected to a display 804. Display 804 may be adapted to display captured images captured by camera 802. The camera 802 (e.g., lens) and display 804 may remain in a single plane while capturing either front facing images (e.g., with respect to the device 800) or back facing images (e.g., with respect to the device 800). The determination for which image angle/face to capture may be user selected, camera selected, remotely selected, or operating system programmed for auto-selection.

Device 800 may optionally include a keyboard 806 communicably attached to device 800/display 804. The communicable attachment may be wired or wireless using any protocol. In some implementations, device 800 does not include a keyboard and can function without a keyboard or with a software keyboard displayed on display 804. In other implementations, a portable electronic device user can access either or both external and internal keyboards connectable to device 800.

In response to automatically or manually receiving a camera mode selection, device 800 can engage a movable reflective element (e.g., a mirror block or wedge) having at least two mirrors can be manufactured and seated between a camera module and a motor driving the element. In operation, the reflective element can be a flip-able, slide-able, rotatable, or otherwise movable reflective/mirror mechanism found inside a camera assembly and operable to steer incoming light to a lens mechanism in the camera assembly. The steering of light may be based on flipping or rotating the reflective element in a particular fashion to engage a front-facing type of image capture or a rear-facing type of image capture. The reflective element may be used to adapt the single camera (e.g., with one or more lenses) to perform dual functions of both forward and rear-facing image capture.

In one non-limiting example, device 800 may be a portable electronic device that includes a display panel and a camera apparatus. The camera apparatus may include at least one lens and an image sensor. The camera apparatus may also include a reflective element. The reflective element may include a base and a first reflective surface angled at about 45 degrees to a second reflective surface, as shown in FIG. 3 (304 and 306). The first and second surfaces (304 and 306) may be seated on the base and connected at a first edge to form the about 45 degree angle and connected at an opposite edge to a dowel pin engaging a motor adapted to move the reflective element. The movement may be based on detected input received at the image sensor, for example.

In some implementations, the input received at the image sensor causes the reflective element to move from a first position to a second position. The movement may select which capture mode will be engaged on the portable electronic device. In addition, the movement indicates which angle light will be reflected from the reflective element in order to capture with a particular capture mode. The movement may be directed in a plane parallel to the base of the reflective element upon and may be in response to detecting an input selecting a front-facing capture mode or a rear-facing capture mode. For example, in some implementations, the reflective element may be adapted to select a direction in which to automatically direct incoming light to the lens based on such movements.

In some implementations, the first reflective surface may include a first mirror and the second reflective surface may include a second mirror. The reflective element may be adapted to be pivotable about the base to direct light from the first mirror to the lens in response to detecting the reflective element is in the first position. In addition, the reflective element may be adapted to be pivotable about the base to direct light from the second mirror to the lens in response to detecting that the reflective element is in the second position.

In some implementations, the reflective element is wedge-shaped and the first mirror and second mirror are connectively coupled to the base. The first mirror may be placed at about 45 degrees to the second mirror. In some implementations, the portable electronic device is a laptop computing device. In some implementations, the portable electronic device is a tablet, a mobile phone, or other portable device including the camera apparatus described herein.

In some implementations, the portable electronic device described herein may include a case with a front surface, a rear surface facing away from the front surface, and a through-hole defining an area between the front surface and rear surface. The through-hole may be adapted to receive an image capture assembly that includes a camera adapted to select a capture mode in which to capture images. The portable electronic device may include a keyboard communicably coupled to the case. The camera may additionally include a motorized reflective element adapted to select a direction from which to direct incoming light to a lens in the camera. The selected direction may indicate the capture mode (e.g., front-facing, side facing, upward facing, downward facing, or rear facing). In some implementations, the motorized reflective element may be wedge-shaped with at least two sides of the wedge including reflective coatings. The motorized reflective element can include such coatings to automatically reflect light beams to a portion of an image sensor. The portion may be selected based at least in part on the capture mode. For example, the capture mode may select a front-facing direction for image capture or a rear-facing direction for image capture. The front-facing direction may be a selfie mode associated with capturing image content of a user of the portable electronic device.

The camera modules described herein can include a single still camera or single video camera. The camera may include or employ image sensors, a stereoscopic camera, an infrared camera, and/or depth-sensing camera. In some implementations, a communication system can be used to upload and download images, instructions, and/or other camera related content. The communication may be wired or wireless and can interface over a private or public network.

Figure 9:
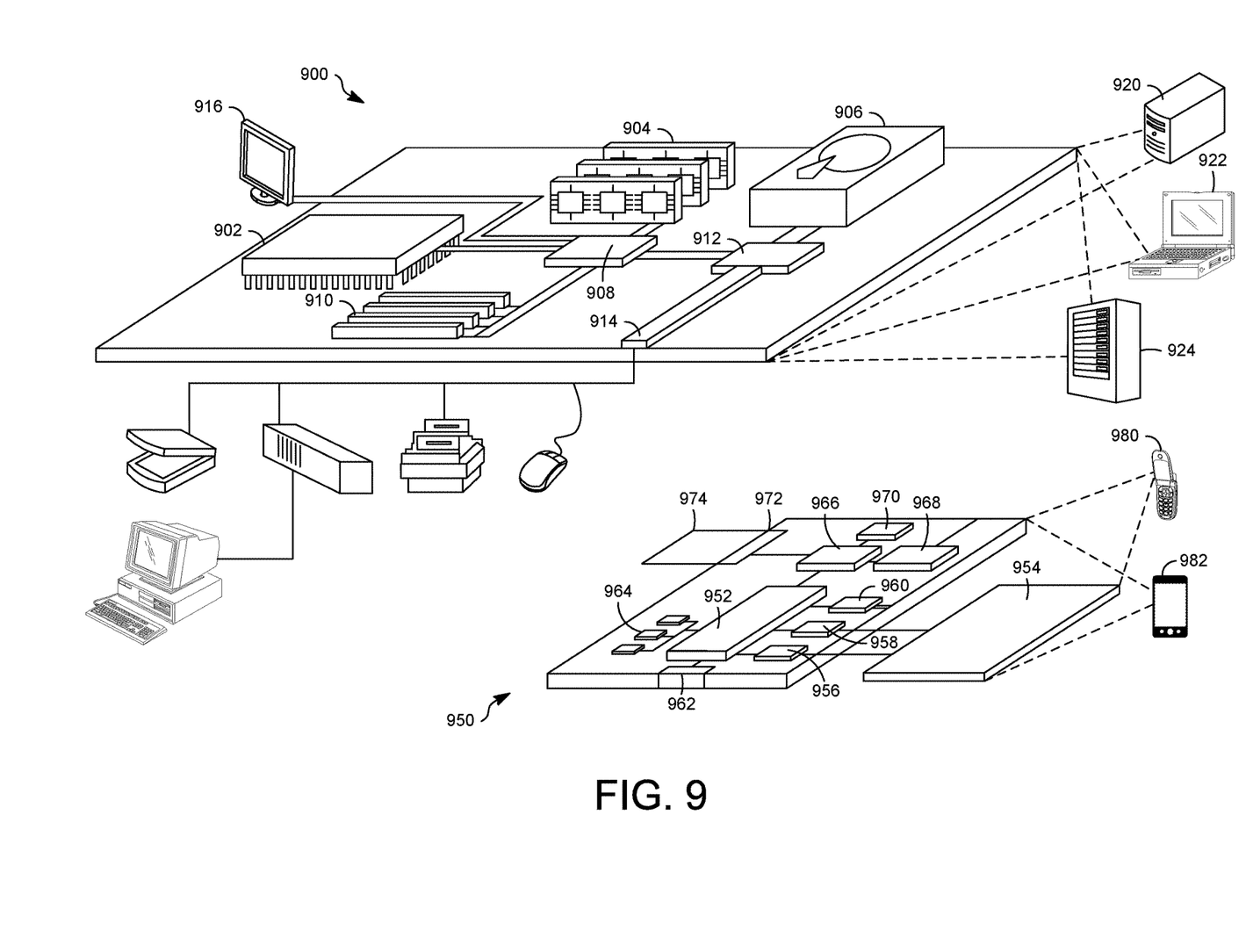
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) above were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A camera apparatus comprising:
   a frame housing;
   a camera module affixed to the frame housing, the camera module including:
      a lens, and
      an image sensor,
   a reflective element disposed within the frame housing, the reflective element including a mirror block and a first magnet, the reflective element being movable relative to the lens to select a direction from which the lens collects light; and
   a motor adapted to move the reflective element from a first position to a second position to select the direction from which the lens collects light;
   wherein the frame housing includes a second magnet and a third magnet centered above the mirror block such that the first magnet of the reflective element aligns with the second magnet of the frame housing in the first position and aligns with the third magnet of the frame housing in the second position, to engage a magnetic field locking the mirror block in place in either the first position or the second position.

2. The apparatus of claim 1, wherein the motor is a cylindrical motor and includes a circular driving coil electrically connected to a control unit on a printed circuit board operable to receive current and transmit the current through the circular driving coil to turn the motor, the motor adapted to move the reflective element from a first position to a second position within the frame housing, the turn automatically selecting a front-facing capture mode or a rear-facing capture mode for the camera apparatus.

3. The apparatus of claim 1, wherein the motor includes a rectangular coil electrically connected to a control unit on a printed circuit board operable to receive current and transmit the current through the rectangular coil to turn the motor, the motor adapted to move the reflective element from a first position to a second position within the frame housing, the turn automatically selecting a front-facing capture mode or a rear-facing capture mode for the camera apparatus.

4. The apparatus of claim 1, wherein the reflective element includes a first mirror affixed to a first plane of the reflective element and a second mirror affixed to a second plane of the reflective element, the reflective element being pivotable about the frame housing to direct light from the first mirror to the lens in response to detecting the reflective element is in the first position, and to direct light from the second mirror to the lens in response to detecting that the reflective element is in the second position.

5. The apparatus of claim 4, wherein the reflective element is wedge-shaped and the first mirror and the second mirror are integrated into the reflective element, the first mirror being angled at about 45 degrees to the second mirror.

6. The apparatus of claim 1, wherein the first mirror and the second mirror each comprise at least one coating of dielectric material affixed to the reflective element.

7. The apparatus of claim 1, further comprising a dowel pin coupled to the reflective element such that the reflective element is rotatable about the dowel pin.

8. The apparatus of claim 1, further comprising a cam adapted to receive rotational input from the motor to move the reflective element from a first position to a second position until engaging a stop surface.

9. The apparatus of claim 8, wherein the first position selects a rear-facing capture mode and the second position selects a front-facing camera mode.

10. A portable electronic device:
    a case including a front surface, a rear surface facing away from the front surface, and a through-hole defining an area between the front surface and rear surface, the through-hole adapted to receive an image capture assembly, the image capture assembly including a camera adapted to select a capture mode in which to capture images; and a keyboard communicably coupled to the case;

wherein the camera includes at least a frame housing and a motorized reflective element adapted to select a direction from which to direct incoming light to a lens in the camera, the selected direction indicating the capture mode, the reflective element including a mirror block and a first magnet, and the frame housing including a second magnet and a third magnet centered above the mirror block such that the first magnet of the reflective element aligns with the second magnet of the frame housing in a first position and aligns with the third magnet of the frame housing in a second position, to engage a magnetic field locking the mirror block in place in either the first position or the second position.

11. The portable electronic device of claim 10, wherein the motorized reflective element being wedge-shaped with at least two sides of the wedge including reflective coatings.

12. The portable electronic device of claim 10, wherein the motorized reflective element automatically reflects light beams to a portion of an image sensor, the portion selected based at least in part on the capture mode.

13. The portable electronic device of claim 10, wherein the capture mode selects a front-facing direction for image capture or a rear-facing direction for image capture.

14. The portable electronic device of claim 13, wherein the front-facing direction is a selfie mode associated with capturing image content of a user of the portable electronic device.

15. A portable electronic device comprising:

a display panel;

a camera apparatus, the camera apparatus including,
at least one lens,
an image sensor, and
a reflective element, the reflective element including a first magnet, a base, and a first reflective surface angled at about 45 degrees to a second reflective surface, the first and second surface seated on the base and connected at a first edge to form the about 45 degree angle and connected at an opposite edge to a dowel pin engaging a motor adapted to move the reflective element based on detected input received at the image sensor, and a frame housing that includes a second magnet and a third magnet centered above the reflective element such that the first magnet of the reflective element aligns with the second magnet of the frame housing in a first position and aligns with the third magnet of the frame housing in a second position, to engage a magnetic field locking the reflective element in place in either the first position or the second position.

16. The portable electronic device of claim 15, wherein the input received at the image sensor causes the reflective element to move from the first position to the second position, the movement being directed in a plane parallel to the base of the reflective element upon detecting an input selecting a front-facing capture mode or a rear-facing capture mode.

17. The portable electronic device of claim 15, wherein the reflective element is further adapted to select a direction from which to automatically direct incoming light to the lens.

18. The portable electronic device of claim 16, wherein the first reflective surface includes a first mirror and the second reflective surface includes a second mirror and the reflective element is adapted to be pivotable about the base to direct light from the first mirror to the lens in response to detecting the reflective element is in the first position and to direct light from the second mirror to the lens in response to detecting that the reflective element is in the second position.

19. The portable electronic device of claim 18, wherein the reflective element is wedge-shaped and the first mirror and second mirror are connectively coupled to the base, the first mirror being placed at about 45 degrees to the second mirror.

20. The portable electronic device of claim 15, wherein the portable electronic device is a laptop computing device.

* * * * *